US008508465B2

(12) United States Patent
Broga et al.

(10) Patent No.: US 8,508,465 B2
(45) Date of Patent: Aug. 13, 2013

(54) MULTIPLE ORIENTATION MOBILE ELECTRONIC HANDHELD DEVICE AND METHOD OF AMBIENT LIGHT SENSING AND BACKLIGHT ADJUSTMENT IMPLEMENTED THEREIN

(75) Inventors: Antanas Matthew Broga, Cambridge (CA); Bergen Albert Fletcher, Kitchener (CA); James Alexander Robinson, Elmira (CA); Thomas James Crugnale, Kitchener (CA)

(73) Assignee: Research In Motion Limited, Waterloo, ON (CA)

( * ) Notice: Subject to any disclaimer, the term of this patent is extended or adjusted under 35 U.S.C. 154(b) by 685 days.

(21) Appl. No.: 12/612,725

(22) Filed: Nov. 5, 2009

(65) Prior Publication Data

US 2011/0102451 A1 May 5, 2011

(51) Int. Cl.

| | |
|---|---|
| ***G09G 3/36*** | (2006.01) |
| ***G09G 5/08*** | (2006.01) |
| ***G09G 5/00*** | (2006.01) |
| ***G06F 3/033*** | (2006.01) |
| ***G06F 3/038*** | (2006.01) |

(52) U.S. Cl.
USPC ............................ 345/102; 345/158; 345/207

(58) Field of Classification Search
USPC .......................... 345/102, 158, 169, 173–178
See application file for complete search history.

(56) References Cited

U.S. PATENT DOCUMENTS

| | | | | |
|---|---|---|---|---|
| 7,352,930 | B2 | 4/2008 | Lowles | |
| 2007/0097065 | A1 * | 5/2007 | Kreek et al. | 345/102 |
| 2007/0188438 | A1 | 8/2007 | Fletcher et al. | |
| 2009/0174680 | A1 * | 7/2009 | Anzures et al. | 345/173 |
| 2009/0278828 | A1 * | 11/2009 | Fletcher et al. | 345/207 |
| 2009/0303215 | A1 * | 12/2009 | Shiozaki | 345/207 |

* cited by examiner

*Primary Examiner* — Alexander S Beck
*Assistant Examiner* — Nguyen H Truong
(74) *Attorney, Agent, or Firm* — Perry + Currier

(57) ABSTRACT

A method is set forth for automatically adjusting display brightness on a mobile electronic device having a light sensor, display screen and orientation sensor, for legibility under varying lighting conditions and orientations of the device. The method includes obtaining light level samples from the light sensor, and orientation from the orientation sensor, and adjusting backlight intensity of the display responsive to the light level samples and orientation of the device. Preferably, backlight adjustments are made from dim to bright notwithstanding orientation of the device whereas adjustments from bright to dim are made only for orientations of the device where the light sensor is unlikely to be covered.

15 Claims, 6 Drawing Sheets

MULTIPLE ORIENTATION MOBILE ELECTRONIC HANDHELD DEVICE AND METHOD OF AMBIENT LIGHT SENSING AND BACKLIGHT ADJUSTMENT IMPLEMENTED THEREIN

FIELD

The present application relates generally to electronic devices and more particularly to a method for automatically adjusting screen and keypad brightness on a multiple orientation mobile electronic handheld device.

BACKGROUND

The display screen on a mobile electronic handheld device may be adjusted for different operating environments. For handheld devices having a display whose operation may be enhanced via backlighting (e.g. a Liquid Crystal Display (LCD)), the backlight should be very bright in outdoor or sunlight conditions for the display to be readable, whereas in normal indoor or office conditions, the backlight should operate at medium brightness and in dim or dark conditions, the backlight should be at low intensity so as to avoid eye strain.

Arrangements have been implemented in GPS displays and laptop computers for providing basic automatic screen and keypad backlighting adjustment, and for providing backlight adjustment of a display in mobile electronic handheld devices, such as disclosed in co-pending U.S. patent application Ser. No. 11/261,708, filed Oct. 31, 2005, and entitled AUTOMATIC SCREEN AND KEYPAD BRIGHTNESS ADJUSTMENT ON A MOBILE HANDHELD ELECTRONIC DEVICE.

Mobile electronic handheld devices conventionally include a light sensor for sampling ambient light conditions, on the basis of which display backlighting may be adjusted for readability in different operating environments (e.g. dimly lit environments, normal indoor environments and bright environments), for example as set forth in U.S. Pat. No. 7,352,930, entitled SHARED LIGHT PIPE FOR A MESSAGE INDICATOR AND LIGHT SENSOR. The location of such light sensors on the device may be such that the sensor becomes covered, and therefore unreliable, in some circumstances. For example, in handheld devices with displays that operate in multiple orientations of the device (e.g. portrait mode and landscape mode), and which have a sensor disposed at a location on the device where a user may be inclined to grip the device in one of the orientations (e.g. landscape mode), it is possible that the user's finger(s) or thumb(s) may inadvertently cover and thereby block the light sensor. A mobile electronic device, and a method that can be carried out by the mobile electronic device, will be described below that may advantageously control display backlight operation so as to accommodate the possibility that the sensor may be blocked in certain orientations of the device.

BRIEF DESCRIPTION OF THE DRAWINGS

The method for automatically adjusting screen and keypad brightness on a mobile handheld electronic device will be better understood with reference to the following description and to the figures, in which.

DETAILED DESCRIPTION OF THE EMBODIMENTS

Figure 1:
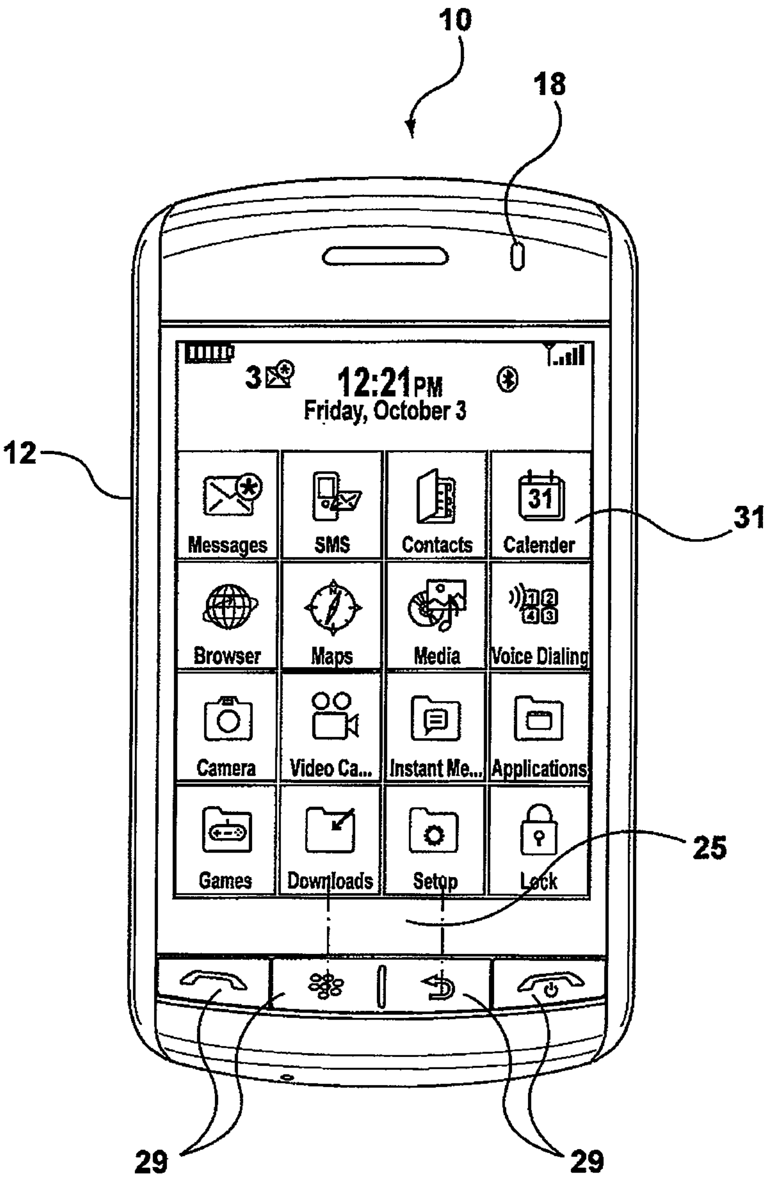
FIG. 1 is a representation of a mobile electronic handheld device in connection with which a method for automatically adjusting screen and keypad brightness is set forth in accordance with one embodiment.

According to one aspect of an exemplary embodiment, there is provided a method for automatically adjusting backlight brightness on a mobile electronic device capable of operating in a DIM mode, an OFFICE mode and a BRIGHT mode, said device having a light sensor, an orientation sensor and a display. The exemplary method comprises obtaining light level samples from said light sensor; determining orientation of said device; and in the event said backlight brightness is in one of either OFFICE mode or BRIGHT mode, and the median value of said samples is less than a first threshold value and said device is in a first orientation, then adjusting the backlight intensity of said display to said DIM mode; in the event said backlight brightness is in one of either OFFICE mode or BRIGHT mode, and the median value of said samples is less than a first threshold value and said device is in another orientation then continuing operation in said OFFICE mode; in the event said backlight brightness is in DIM mode and the median value of said samples is greater than a second threshold value then adjusting the backlight intensity of said display to said OFFICE mode; in the event said backlight brightness is in BRIGHT mode and the median value of said samples is greater than said first threshold value and less than a third threshold value, then adjusting the backlight intensity of said display to said OFFICE mode; and in the event said backlight brightness is in one of either said DIM mode or said OFFICE mode and the median value of said samples is greater than a fourth threshold value, then adjusting the backlight intensity of said display to said BRIGHT mode.

According to another aspect of an exemplary embodiment, there is provided a mobile electronic device, comprising a light sensor; an orientation sensor; a display; and a processor connected to said light sensor, said display and said orientation sensor for obtaining light level samples from said light sensor; determining orientation of said device from said orientation sensor; and in the event said backlight brightness is in one of either OFFICE mode or BRIGHT mode, and the median value of said samples is less than a first threshold value and said device is in a first orientation, then adjusting the backlight intensity of said display to said DIM mode; in the event said backlight brightness is in one of either OFFICE mode or BRIGHT mode, and the median value of said samples is less than a first threshold value and said device is in another orientation then continuing operation in said OFFICE mode; in the event said backlight brightness is in DIM mode and the median value of said samples is greater than a second threshold value then adjusting the backlight intensity of said display to said OFFICE mode; in the event said backlight brightness is in BRIGHT mode and the median value of said samples is greater than said first threshold value and less than a third threshold value, then adjusting the backlight intensity of said display to said OFFICE mode; and in the event said backlight brightness is in one of either said DIM mode or said OFFICE mode and the median value of said samples is greater than a fourth threshold value, then adjusting the backlight intensity of said display to said BRIGHT mode.

Figure 2:
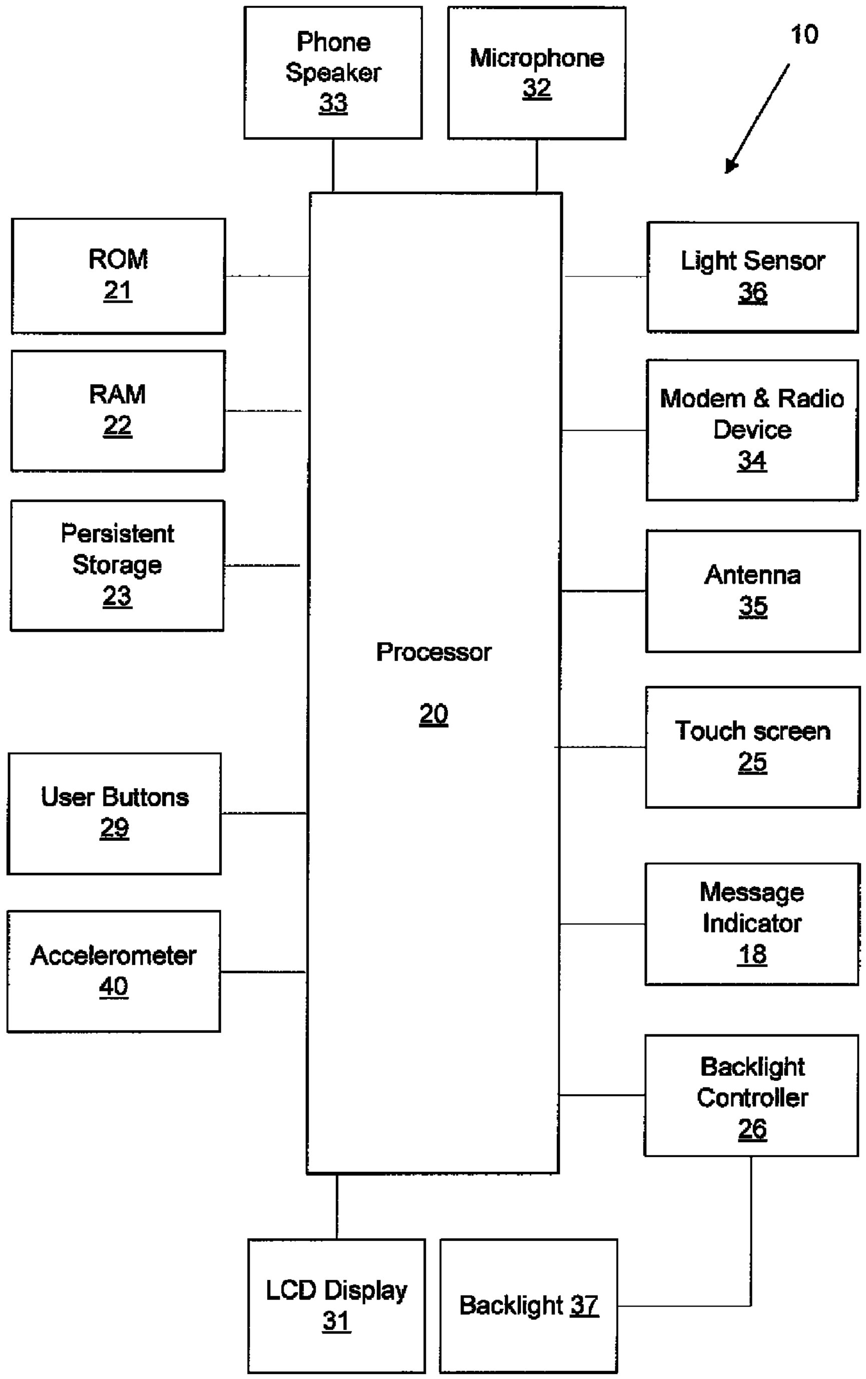
FIG. 2 is a block diagram of certain internal components within the mobile electronic handheld device of FIG. 1.

Referring to FIGS. 1 and 2, a mobile electronic handheld device is indicated generally by the numeral 10. In the present embodiment, the device 10 is based on the computing environment and functionality of a wireless personal digital assistant. It will be understood, however, that the device 10 is not limited to a wireless personal digital assistant. Other devices are possible, such as desktop computers, cellular telephones, GPS receivers, smart telephones, handheld electronic gaming devices, and laptop computers. Referring again to the present embodiment, the device 10 includes a housing 12 that frames a display 31, a speaker 33, a message notification indicator 18, a multi-directional device touch sensitive input 25 (touch screen) to the display 31, and buttons 29. In a typical embodiment described below, display 31 comprises Liquid Crystal Display (LCD), and may be called an LCD display. The disclosure not limited to embodiments in which display 31 is an LCD display, however. The message notification indicator 18 may be in the form of a light pipe having two internal branches terminating respectively in a Light Emitting Diode (LED) and an ambient light sensor, as set forth in U.S. Pat. No. 7,352,930, referred to above. The housing 12 may be made from any material or combination of materials that can provide structural integrity to frame the various components, to hold the components in a substantially stable relationship to one another, and can be stored, for example, in a holster (not shown) that includes an attachment for attaching to a user's belt.

FIG. 2 shows certain components within an exemplary embodiment of the mobile electronic handheld device 10, including a processor 20 connected to a read-only-memory (ROM) 21 that contains a plurality of applications executable by the processor 20 for enabling each portable electronic device 10 to perform certain functions including, for example, Personal Identification Number (PIN) message functions, Short Message Service (SMS) message functions, address book and calendaring functions, camera functions, and cellular telephone functions. More particularly, processor 20 may execute applications within ROM 21 for providing notification of events such as incoming calls and/or emails, appointments, tasks, etc. The processor 20 is also connected to a random access memory unit (RAM) 22 and a persistent storage device 23 to facilitate various non-volatile storage functions of the portable electronic device 10. The processor 20 receives input from one or more input devices, including ambient light sensor 36, user buttons 29 and an orientation sensor 40, such as an accelerometer, for detecting orientation of the device 10 (i.e. for operation in one of either portrait mode or landscape mode). A person of skill in the art will appreciate that other types of orientation sensors may be used, such as Hall Effect sensors, etc.

The processor 20 outputs to one or more output devices, including a Liquid Crystal Display (LCD) display 31, a backlight controller 26 and message notification indicator 18. A microphone 32 and phone speaker 33 are connected to the processor 20 for cellular telephone functions. The processor 20 is also connected to a modem and radio device 34. The modem and radio device 34 is used to connect to wireless networks and transmit and receive voice and data communications through an antenna 35.

A typical backlight system comprises a backlight lighting source 37, such as a series of LEDs or a lamp located behind the display 31, and backlight controller 26 to control activation of the backlight 37. One example of a backlight controller is set forth in co-pending U.S. patent application Ser. No. 11/353,014, filed Feb. 14, 2006, and entitled SYSTEM AND METHOD FOR ADJUSTING A BACKLIGHT LEVEL FOR A DISPLAY ON AN ELECTRONIC DEVICE. The lamp may be fluorescent, incandescent, electroluminescent or other light source. The intensity of the backlight level may be controlled by the controller 26 by adjusting current or voltage, by selectively activating a selected number of lighting sources (e.g. one, several or all LEDs) or by selectively controlling the activation duty cycle of the activated lighting sources (e.g. a duty cycle anywhere between 0% to 100% may be used).

To assist with one method of adjusting the backlight level, light sensor 36 is provided on device 10. Sensor 36 is a light sensitive device which converts detected light levels into an electrical signal, such as a voltage. It may be located anywhere on device 10, having considerations for aesthetics and operation characteristics of sensor 36. However as discussed above, in one embodiment, an opening for light to be received by sensor 36 is located on the front cover of the housing of device 10 at a corner thereof (to reduce the likelihood of blockage the opening and thereby also blocking the sensor). In other embodiments, multiple sensors 36 may be provided and controller 26 may operate to provide different emphasis on signals provided from different sensors 36. The signal(s) provided by sensor(s) 36 can be used by a circuit in device 10 to determine when device 10 is in a well-lit, dimly lit or moderately-lit environment, as discussed in greater detail below.

In one aspect, this disclosure sets forth an extension of the specification in U.S. patent application Ser. No. 11/261,708, in describing a method for automatically adjusting backlight brightness in a multiple orientation mobile electronic handheld device.

Figure 3A:
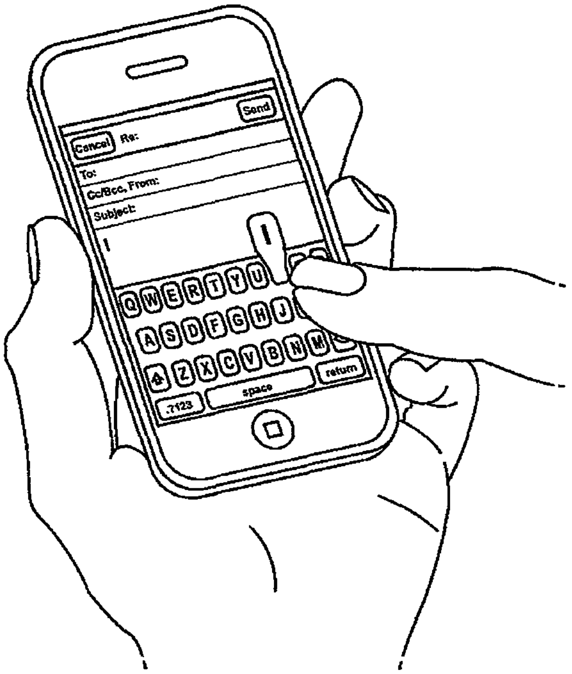
FIGS. 3A and 3B show mobile electronic handheld device of FIG. 1 being held in orientations for operation of a display in portrait and landscape modes, respectively.
Figure 3B:
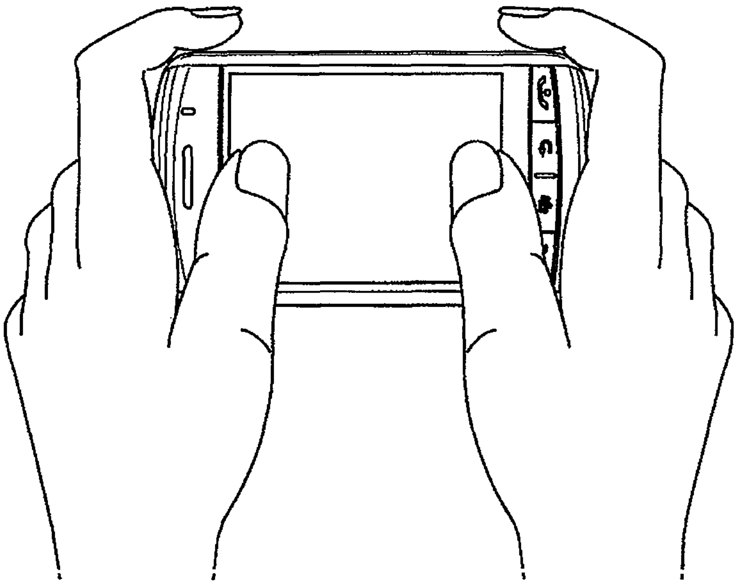

As discussed above, the location of light sensor 36 on the device 10 may be such that the sensor becomes covered, and therefore unreliable, in some circumstances. For example, when the device 10 is operated in portrait mode as shown in FIG. 3A, the sensor 36 is unobstructed so that accurate ambient light readings may be taken. However, when the device 10 is operated in landscape mode as shown in FIG. 3B, the sensor it is possible that the user's finger(s) or thumb(s) may inadvertently cover and thereby block the light sensor 36.

Figure 4:
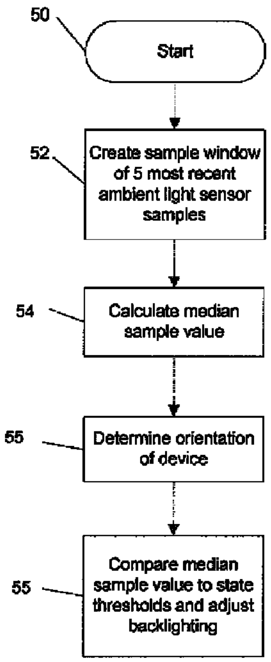
FIG. 4 is a flowchart showing steps in a method for automatically adjusting screen brightness in the mobile electronic handheld device of FIG. 1.

Reference is now made to FIG. 4, showing a flowchart of a method for automatically adjusting the backlight brightness of display 31 on the mobile handheld electronic device 10 of FIGS. 1-3. The method is implemented by an algorithm within an application executable by the processor 20 to correctly switch between three screen-specific ambient lighting modes (referred to herein as DIM, OFFICE and BRIGHT, respectively). In DIM mode, the display 31 backlight is dimmed for low lighting environment. In OFFICE mode, the display 31 backlight is set to a brightness for an office environment. In BRIGHT mode, and the display 31 backlight is set at full brightness, for legibility in bright sunlight. The DIM, OFFICE and BRIGHT modes are determined by detected ambient light conditions and operate to set the backlight to appropriate operating states, as discussed in greater detail below.

Each ambient lighting mode has a corresponding brightness/state value as set forth in Table A, where "% PWM" represents the duty cycle of a pulse width modulated signal of variable base frequency dependent on the specified duty cycle, and "Lux range" represents the range of ambient lighting intensity (measured in Lux units, where Lux represents the amount of visible light per square meter incident on a surface) in which each mode operates:

TABLE A

| | Screen Backlight Mode | | |
|---|---|---|---|
| | DIM mode | OFFICE mode | BRIGHT mode |
| Lux range of ambient lighting | <70 | 16 < Lux < 4400 | 3000 < Lux |
| Screen backlight brightness | 3%-6.5% PWM (based on 10%-100% brightness defined in Screen options screen) | 10%-40% PWM (based on 10%-100% brightness defined in Screen options screen) | 100% PWM (this "overdrives" the backlight circuit) |

As indicated in Table A, the display 31 backlight is adjustable in 5 or 10 discreet steps between 3% and 6.5% PWM, an additional 5 or 10 discreet steps between 10% and 40% PWM and may also be set to 100% PWM Backlight brightness control also permits a smoothly and quick fade (~200 ms) and a slow fade (1-1.5 s) between any of these steps (in addition to the off state).

Upon starting the algorithm (step 50) when the device 10 is turned on, the backlight mode is normally initialized to an appropriate mode using the ambient lighting sensed by the light sensor 36 at that time. Next, light sensor samples are taken at set intervals and maintained in a buffer containing the five most recent samples at any given time (step 52). This buffer is referred to as the sample window because it is a moving window such that when each new sample is received, the oldest sample in the window is discarded from the buffer. The amount of time between each light sensor sample determines the sampling rate. A typical sampling rate is one sample per 1.2 seconds although in some situations the sampling rate may be increased to 400 ms temporarily for 5 samples to facilitate quick adjustment of the screen backlight. At step 54, the median sample value is calculated by sorting all samples in the sample window and choosing the middle value (i.e. the third sample in the window).

When each sample is received, orientation of the device 10 is detected using accelerometer 40 (step 55), and a new median in the sample window is calculated and compared to various thresholds (step 56) to determine if a backlight adjustment is necessary, according to the detected orientation of the device (i.e. portrait or landscape), as depicted in the exemplary state Table B, where ADC represents Analog to Digital Converter output values:

TABLE B

| Median Light Sensor ADC Value | Current Mode = DIM | Current Mode = OFFICE | Current Mode = BRIGHT |
|---|---|---|---|
| Threshold 7 Orientation = Portrait | No Change | Switch to DIM | Switch to DIM |
| Threshold 7 Orientation = Landscape | No Change | No Change | No Change |
| Threshold 14 Orientation = Portrait | Switch to OFFICE | No Change | No Change |
| Threshold 14 Orientation = Landscape | Switch to OFFICE | No Change | No Change |
| Threshold 450 Orientation = Portrait | Switch to OFFICE | No Change | Switch to OFFICE |
| Threshold 450 Orientation = Landscape | Switch to OFFICE | No Change | Switch to OFFICE |
| Threshold 650 Orientation = Portrait | Switch to BRIGHT | Switch to BRIGHT | No Change |
| Threshold 650 Orientation = Landscape | Switch to BRIGHT | Switch to BRIGHT | No Change |

The relationship between ADC threshold values expressed in Table B and light intensity values is as follows: ADC 7=16 Lux, ADC 14=60 Lux, 16 ADC=70 Lux, 50 ADC=250 Lux, ADC 450=3000 Lux, and ADC 650=4400 Lux. Operation of the state Table B is depicted in the flowcharts of FIGS. 4, 5 and 6.

Figure 5:
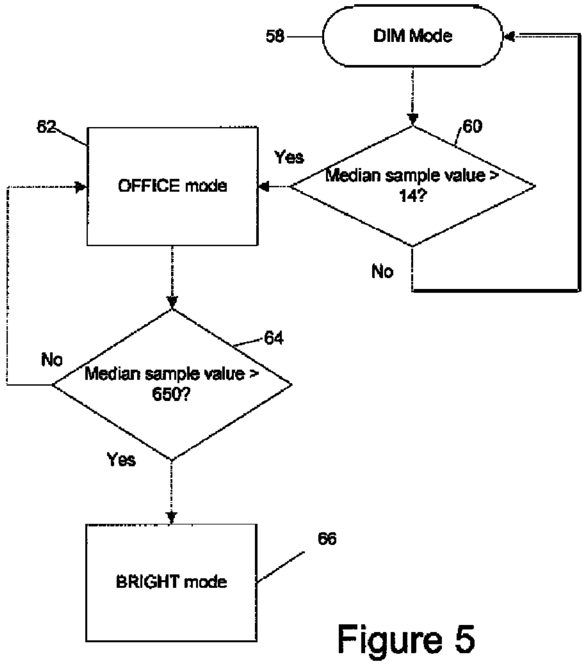
FIG. 5 is a flowchart showing steps in the method of FIG. 3 when the mobile electronic handheld device is in DIM mode.

Thus, as shown in FIG. 5, when the backlighting is in DIM mode, the median sample value is compared (step 58) to a threshold value of 14 (70 Lux) and if the value is greater than 14 OFFICE mode of backlight operation is selected (step 62) wherein the display 31 backlight is at a brightness for an office environment. However, if the median sample value is greater than 650 (step 64) then BRIGHT mode of backlight operation is selected (step 66) wherein the display 31 backlight is set to full brightness.

Figure 6:
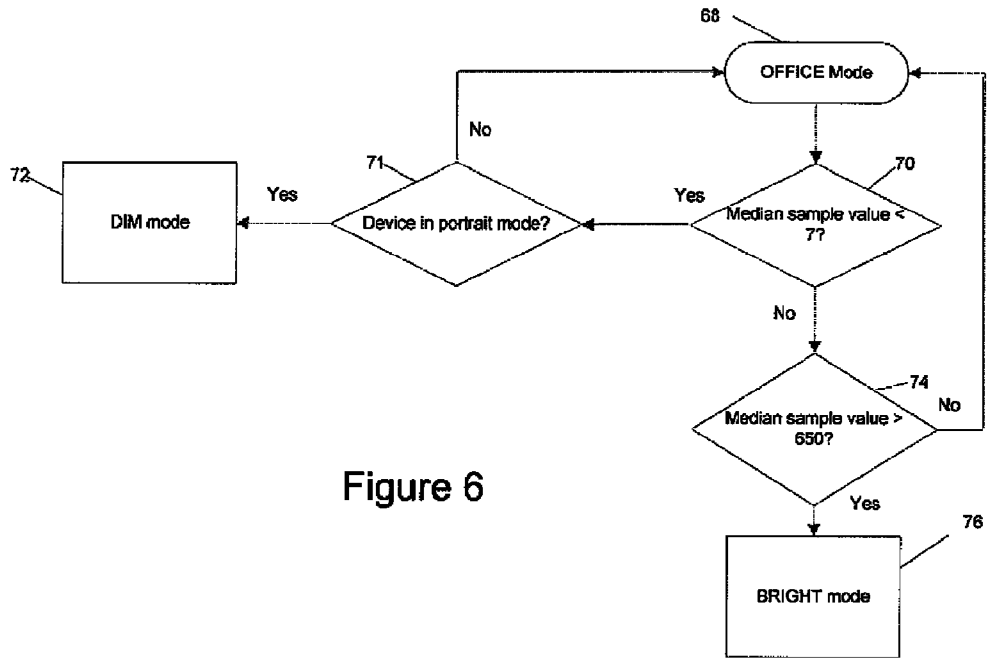
FIG. 6 is a flowchart showing steps in the method of FIG. 4 when the mobile electronic handheld device is in OFFICE mode.

As shown in FIG. 6, when the backlighting is in OFFICE mode (step 68), the median sample value is compared (step 70) to a threshold value of 7 (16 Lux) and if the value is less than 7, a determination is made as to orientation of the device (step 71). If the device is oriented for operation in portrait mode, then DIM mode of backlight operation is selected (step 72) wherein the display 31 backlight is dimmed. Otherwise, the device is oriented for landscape mode, with the attendant risk that the sensor 36 is covered and therefore not generating accurate ambient light level samples, in which case backlight operation continues in OFFICE mode (step 68).

If the median sample value is greater than 650 (step 74) then BRIGHT mode of backlight operation is selected (step 76) wherein the display 31 backlight is set to full brightness.

Figure 7:
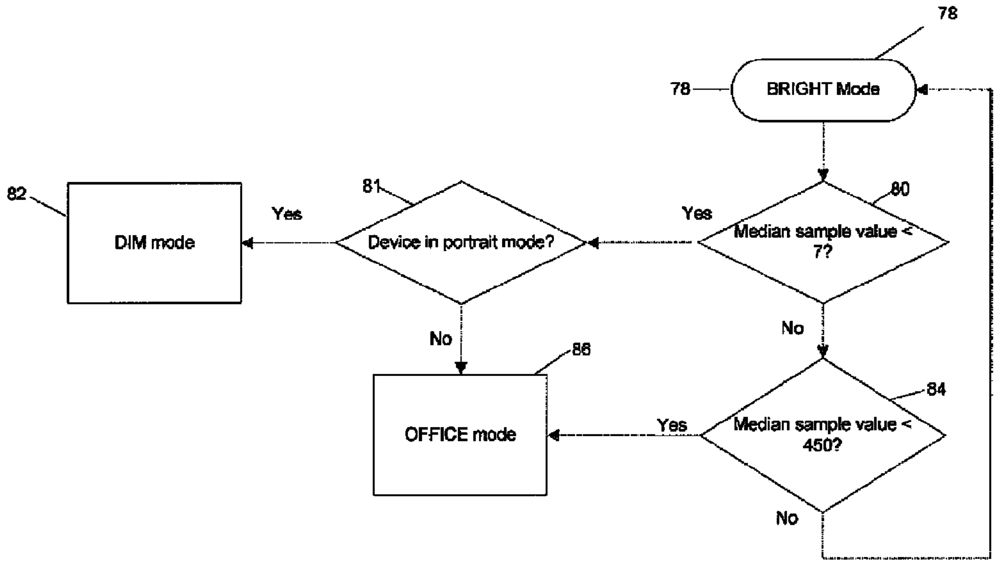
FIG. 7 is a flowchart showing steps in the method of FIG. 4 when the mobile electronic handheld device is in BRIGHT mode.

As shown in FIG. 7, when the backlighting is in BRIGHT mode (step 78), the median sample value is compared (step 80) to a threshold value of 7 and if the value is less than 7, a determination is made as to orientation of the device (step 81). If the device is oriented for operation in portrait mode, then DIM mode of backlight operation is selected (step 82)

wherein the display 31 backlight is dimmed. Otherwise, the device is oriented for landscape mode, with the attendant risk that the sensor 36 is covered and therefore not generating accurate ambient light level samples, in which case backlight operation switches to OFFICE mode (step 86).

If the median sample value is less than 450 (step 84) then OFFICE mode of backlight operation is selected (step 86) wherein the display 31 backlight is dimmed to a level for an office environment.

From FIGS. 5 and 6, it will be noted that the threshold for changing from DIM mode to OFFICE mode is higher than the threshold for changing from OFFICE to DIM mode. This compensates for situations where the ambient lighting is hovering around a particular threshold value and prevents constant transitioning between backlight states. A similar hysteresis is integrated into the threshold values between the OFFICE and BRIGHT modes (FIGS. 6 and 7).

By using the median sample in the sample window for mode-change decisions, brief lighting fluctuations (e.g. bright flashes lasting less than about 800 ms) are effectively filtered out while still providing an acceptably quick response to entering an area with bright sunlight or pulling the device out of the holster in bright sunlight. Transitioning through a dim environment for less than about 5 seconds is also ignored because all five samples in the sample window are required to be less than the threshold value for the currently active mode to affect a mode change. Since it takes several seconds for a user's eyes to adjust to a dimmer environment, the LCD display 31 brightness is permitted by the algorithm to adjust gradually.

From the foregoing, it will be appreciated that backlight adjustment may be provided according to the methods set forth herein for multiple orientations of the mobile handheld electronic device 10, such as in landscape mode where a brighter backlight may be used for display of multimedia.

Figure 8:
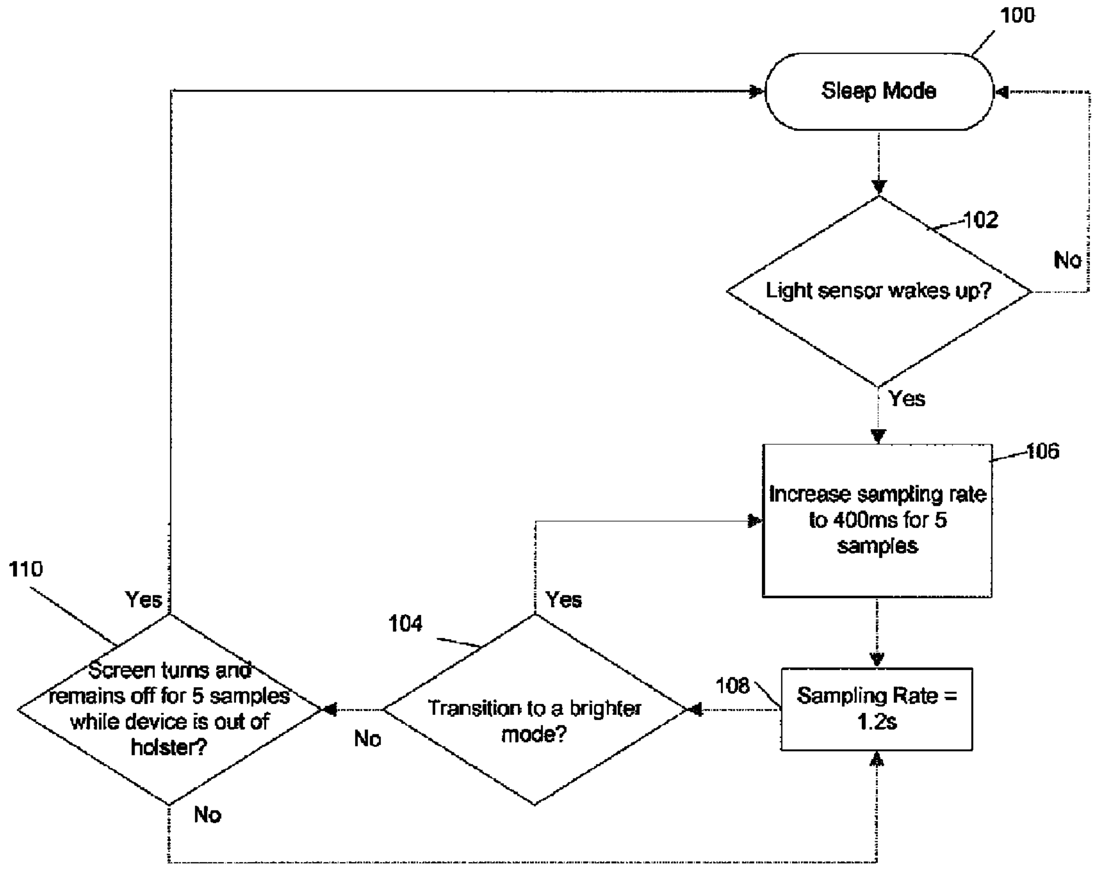
FIG. 8 is a flow chart showing steps for controlling sample rate for the methods of FIGS. 4-7.

As shown in FIG. 8, light sensor samples are not taken (i.e. sleep mode) while the device 10 is off or in the holster (step 100) in order to save battery life and because samples are not likely to be valid because the light sensor is likely covered by an arm (device 10 is in holster) or in a bag or a pocket. When the light sensor software "wakes up" (step 102), sampling and backlight adjustment begins (step 106) with a fast sampling rate (400 ms) for the next five samples. The first sample received is used to initialize the entire sample window, if the second sample is brighter than the first, then this value is used to initialize the entire sample window. If the third sample is brighter than the first two, then it is used to initialize the sample window.

Thereafter, the normal sampling rate is one sample every 1.2 seconds (step 108). Preferably, each light sensor sample is actually an average of multiple quick samples taken over a period of about 9 ms. More particularly, at least 8 ADC readings are taken over a 9 ms period so that they can be averaged out so as to increase the reliability of each sample and filter out small variances in AC indoor lighting.

When the device 10 is pulled out of its holster, removed from a pocket or bag, etc., it is highly likely that the light sensor will be temporarily partially covered by the user's hand or shirt. This means that the first couple samples could be below the threshold for transitioning to DIM mode, even if the device 10 is operating in the OFFICE mode. Likewise, the first couple of samples could be indicative of OFFICE mode even though the device is in a bright environment. However, it is nearly impossible for a brighter sample to be received when the device is in a dim environment. Hence, as discussed above, the entire sample window is initialized to the greatest sample when the device 10 out of the holster.

If the display 31 turns off due to a system timeout or the power button being pressed, but the device 10 has not been yet been turned off or returned to its holster (step 110), then light sensor sampling reverts to sleep mode (step 100) provided the display 31 does not turn back on within the time it takes to receive the next five samples. This five sample delay is provided because the display 31 may time out while the user is reading the screen. It is common for a user to handle this situation by hitting a key to immediately wake up the screen again (which turns on the backlight). In this case, the sample window is not reset to sleep mode. If the LCD screen 4 stays off for more than a few seconds then the sample window is reset to sleep mode due to the likelihood that the device environment has changed.

Based on the foregoing, LCD display 31 brightness responds to a change from a dimmer to a brighter environment within 800 ms to 2 seconds. This is the amount of time that it takes to receive three brighter samples (which sets the median of the 5-sample window). The first sample in a brighter environment triggers the fast 400 ms sampling rate (step 104). However, it can take up to 1.2 seconds before the first sample is received. LCD display 31 brightness responds to a change from a brighter environment to a dimmer mode in about 6 seconds. It takes 5 consecutive samples in a dimmer mode to cause a transition to the new mode. When the display 31 backlight brightness is adjusted downwardly, the backlight is slowly faded to the new brightness level. This fading takes from about 1 s to 1.5 s.

In one embodiment of mobile electronic handheld device 10, the light sensor 36 and message indicator 18 (e.g. LED) share a common light pipe. If the sampling algorithm of FIG. 7 requires a light sensor sample to be taken while the LED is on, then the sample is delayed until immediately after the LED turns off, unless the device 10 is in the process of being pulled out of its holster. In this case, an initial low light sample is "faked" if the LED is on while removing the device 10 from its holster, etc. so as not to delay turning on the LCD display 31 backlight (which cannot occur until a sample has been received). Each LED on/off transition is controlled so that the state information can be provided to the automatic backlight software set forth herein of LED on/off transitions.

Preferably, coarse timers are used in the described method (e.g. +/−12.5% variance). The use of coarse timers minimizes the number of times the processor 36 must wake up due to timer events. Consequently, all times referred to in this specification are characterized by a possible error of +/−12.5%.

While the embodiments described herein are directed to particular implementations of the method for automatically adjusting screen brightness on a mobile handheld electronic device, it will be understood that modifications and variations to these embodiments are within the scope and sphere of the present application. For example, as indicated above the backlighting brightness adjustment methodology set forth herein is not limit in its application to handheld electronic devices but may advantageously applied to other electronic devices such as desktop computers, cellular telephones, GPS receivers, smart telephones, portable gaming devices, and laptop computers. Also, backlight adjustment may be controlled based on device orientations other than portrait and landscape (e.g. upside down, level, etc.), or wherein the sensor 36 is positioned at a different location on the device 10, where possible obstruction of the light sensor 36 may occur. Many other modifications and variations may occur to those skilled in the art. All such modifications and variations are believed to be within the sphere and scope of the present application.

What is claimed is:

1. A method for automatically adjusting backlight brightness on a mobile electronic device capable of operating in a DIM mode, an OFFICE mode and a BRIGHT mode, said device having a light sensor, an orientation sensor and a display, the method comprising:

obtaining light level samples from said light sensor;

determining orientation of said device; and in the event said backlight brightness is in one of either OFFICE mode or BRIGHT mode, and the median value of said samples is less than a first threshold value and said device is in a first orientation, then adjusting the backlight intensity of said display to said DIM mode, wherein the backlight intensity of said display in said DIM mode is less than said backlight intensity in said OFFICE mode, and the backlight intensity of said display in said OFFICE mode is less than said backlight intensity in said BRIGHT mode, in the event said backlight brightness is in one of either OFFICE mode or BRIGHT mode, and the median value of said samples is less than a first threshold value and said device is in another orientation then continuing operation in said OFFICE mode;

in the event said backlight brightness is in DIM mode and the median value of said samples is greater than a second threshold value then adjusting the backlight intensity of said display to said OFFICE mode;

in the event said backlight brightness is in BRIGHT mode and the median value of said samples is greater than said first threshold value and less than a third threshold value, then adjusting the backlight intensity of said display to said OFFICE mode;

and in the event said backlight brightness is in one of either said DIM mode or said OFFICE mode and the median value of said samples is greater than a fourth threshold value, then adjusting the backlight intensity of said display to said BRIGHT mode.

2. The method of claim 1, wherein said first orientation and said another orientation are orientations of said device for display in a portrait mode and a landscape mode, respectively.

3. The method of claim 1, wherein said first threshold value is approximately 16 Lux.

4. The method of claim 1, wherein said fourth threshold value is approximately 4400 Lux.

5. The method of claim 1, wherein said second threshold value is approximately 60 Lux.

6. The method of claim 1, wherein said third threshold value is approximately 3000 Lux.

7. The method of claim 1, wherein said light level samples are obtained at a first sampling rate upon activation of said light sensor or in the event of a transition from said DIM mode to said OFFICE or BRIGHT modes or from said OFFICE mode to said BRIGHT mode, and otherwise are obtained at a second sampling rate.

8. The method of claim 7, wherein said median value is calculated from five consecutive ones of said light level samples.

9. The method of claim 8, wherein said first sampling rate is maintained for five samples whereupon further light level samples are obtained at said second sampling rate.

10. The method of claim 9, wherein said first sampling rate is one sample per approximately 400 ms and said second sampling rate is one sample per approximately 1.2 seconds.

11. The method of claim 10, wherein said first and second sampling rates are each subject to a variance of approximately +/−12.5%.

12. The method of claim 8, wherein said median value is calculated by sorting and selecting the third of said five samples.

13. A mobile electronic device, comprising:

a light sensor;

an orientation sensor;

a display; and a processor connected to said light sensor, said display and said orientation sensor for obtaining light level samples from said light sensor;

determining orientation of said device from said orientation sensor; and in the event said backlight brightness is in one of either OFFICE mode or BRIGHT mode, and the median value of said samples is less than a first threshold value and said device is in a first orientation, then adjusting the backlight intensity of said display to said DIM mode, wherein the backlight intensity of said display in said DIM mode is less than said backlight intensity in said OFFICE mode, and the backlight intensity of said display in said OFFICE mode is less than said backlight intensity in said BRIGHT mode, in the event said backlight brightness is in one of either OFFICE mode or BRIGHT mode, and the median value of said samples is less than a first threshold value and said device is in another orientation then continuing operation in said OFFICE mode;

in the event said backlight brightness is in DIM mode and the median value of said samples is greater than a second threshold value then adjusting the backlight intensity of said display to said OFFICE mode;

in the event said backlight brightness is in BRIGHT mode and the median value of said samples is greater than said first threshold value and less than a third threshold value, then adjusting the backlight intensity of said display to said OFFICE mode;

and in the event said backlight brightness is in one of either said DIM mode or said OFFICE mode and the median value of said samples is greater than a fourth threshold value, then adjusting the backlight intensity of said display to said BRIGHT mode.

14. The mobile electronic device claim 13, wherein said orientation sensor comprises an accelerometer for detecting orientation of said device in at least said first orientation and said another orientation.

15. The mobile electronic device claim 13, wherein said display is an LCD display.

* * * * *